US010190455B2

(12) United States Patent
Hampton et al.

(10) Patent No.: US 10,190,455 B2
(45) Date of Patent: Jan. 29, 2019

(54) VENTURI DEVICES RESISTANT TO ICE FORMATION FOR PRODUCING VACUUM FROM CRANKCASE GASES

(71) Applicants: Keith Hampton, Ann Arbor, MI (US);
David E. Fletcher, Flint, MI (US);
Brian M. Graichen, Leonard, MI (US);
James H. Miller, Ortonville, MI (US);
Andrew D. Niedert, Farmington Hills, MI (US)

(72) Inventors: Keith Hampton, Ann Arbor, MI (US);
David E. Fletcher, Flint, MI (US);
Brian M. Graichen, Leonard, MI (US);
James H. Miller, Ortonville, MI (US);
Andrew D. Niedert, Farmington Hills, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 0 days.

(21) Appl. No.: 15/337,454

(22) Filed: Oct. 28, 2016

(65) Prior Publication Data

US 2017/0122153 A1    May 4, 2017

Related U.S. Application Data

(60) Provisional application No. 62/247,434, filed on Oct. 28, 2015.

(51) Int. Cl.
*F01M 13/02* (2006.01)
*F02M 25/06* (2016.01)
(Continued)

(52) U.S. Cl.
CPC .......... *F01M 13/021* (2013.01); *F02M 25/06* (2013.01); *F02M 35/10229* (2013.01); *F04F 5/04* (2013.01); *F01M 2013/027* (2013.01)

(58) Field of Classification Search
CPC ......... F01M 13/021; F04F 5/04; F02M 25/06; F02M 35/10229
See application file for complete search history.

(56) References Cited

U.S. PATENT DOCUMENTS 1,071,596 A    8/1913  Von Vellebit
1,845,969 A    2/1932  Hueber
(Continued)

FOREIGN PATENT DOCUMENTS

CN       2400655      10/2000
CN      201907500      7/2011
(Continued)

OTHER PUBLICATIONS

Plastic Vacuum Ejector Generator Pneumatic Fitting ZH07DS (first published at least as early as Dec. 29, 2015).
(Continued)

*Primary Examiner* — Jacob Amick
(74) *Attorney, Agent, or Firm* — FisherBroyles, LLP; Susan M. Oiler

(57) ABSTRACT

A device for producing vacuum using the Venturi effect, systems utilizing the device, and methods of making the device are disclosed. The device has a housing defining a Venturi gap, a motive passageway converging toward the Venturi gap and in fluid communication therewith, a discharge passageway diverging away from the Venturi gap and in fluid communication therewith, and a suction passageway in fluid communication with the Venturi gap. The suction passageway has an interior surface with a surface topography that renders the interior surface hydrophobic and has an oleophobic coating applied to the interior surface while maintaining the surface topography.

19 Claims, 3 Drawing Sheets

(51) Int. Cl.
*F02M 35/10* (2006.01)
*F04F 5/04* (2006.01)

(56) References Cited

U.S. PATENT DOCUMENTS

| | | |
|---|---|---|
| 2,037,884 A | 4/1936 | Day |
| 2,183,561 A | 12/1939 | Hamblin |
| 2,274,276 A | 2/1942 | Rappl |
| 2,512,479 A | 6/1950 | Callejo |
| 2,626,009 A | 1/1953 | Sebok et al. |
| 2,905,268 A | 9/1959 | McMichael |
| 2,954,091 A | 9/1960 | McMichael |
| 3,064,878 A | 11/1962 | Bayles et al. |
| 3,093,153 A | 6/1963 | Horowitz |
| 3,234,932 A | 2/1966 | Bird et al. |
| 3,239,131 A | 3/1966 | Whyte |
| 3,430,437 A | 3/1969 | Saussele et al. |
| 3,581,850 A | 6/1971 | Jaitl |
| 3,698,510 A | 10/1972 | Blatt et al. |
| 3,754,841 A | 8/1973 | Grabb et al. |
| 3,826,281 A | 7/1974 | Clark |
| 3,842,932 A | 10/1974 | Gibel |
| 3,923,081 A | 12/1975 | Persson |
| 4,132,247 A | 1/1979 | Lindberg |
| 4,208,921 A | 6/1980 | Keyes |
| 4,211,200 A | 7/1980 | Rocchio et al. |
| 4,308,138 A | 12/1981 | Woltman |
| 4,354,492 A | 10/1982 | McPhee |
| 4,379,679 A | 4/1983 | Guile |
| 4,380,418 A | 4/1983 | Crawford et al. |
| 4,424,883 A | 1/1984 | Musiani |
| 4,499,034 A | 2/1985 | McAllister |
| 4,519,423 A | 5/1985 | Ho et al. |
| 4,554,786 A | 11/1985 | Takeuchi et al. |
| 4,634,559 A | 1/1987 | Eckert |
| 4,683,916 A | 8/1987 | Raines |
| 4,834,132 A | 5/1989 | Sasaki et al. |
| 4,893,654 A | 1/1990 | Feuz |
| 4,938,309 A | 7/1990 | Emdy |
| 4,951,708 A | 8/1990 | Miller |
| 5,005,550 A | 4/1991 | Bugin, Jr. et al. |
| 5,069,062 A | 12/1991 | Malecek et al. |
| 5,087,175 A | 2/1992 | Raizman et al. |
| 5,108,266 A | 4/1992 | Hewitt |
| 5,188,141 A | 2/1993 | Cook et al. |
| 5,291,916 A | 3/1994 | Kloosterman et al. |
| 5,326,942 A | 7/1994 | Schmid |
| 5,375,621 A | 12/1994 | Gaehwiler |
| 5,628,623 A | 5/1997 | Skaggs |
| RE35,532 E | 6/1997 | Duren |
| 5,816,446 A | 10/1998 | Steindorf et al. |
| 5,881,759 A | 3/1999 | Andersson |
| 5,993,167 A | 11/1999 | Mochizuki |
| 6,035,881 A | 3/2000 | Emmerich et al. |
| 6,132,629 A | 10/2000 | Boley |
| 6,138,456 A | 10/2000 | Garris |
| RE37,090 E | 3/2001 | Kloosterman et al. |
| 6,220,271 B1 | 4/2001 | Emmerich et al. |
| 6,254,315 B1 | 7/2001 | Pfeiffer |
| 6,308,731 B1 | 10/2001 | Kawasaki |
| 6,325,602 B1 | 12/2001 | Rademacher |
| 6,502,397 B1 | 1/2003 | Lundqvist |
| 6,575,022 B1 | 6/2003 | Schneider et al. |
| 6,626,249 B2 | 9/2003 | Rosa |
| 7,029,103 B2 | 4/2006 | Iida |
| 7,100,587 B2 | 9/2006 | Ahlborn et al. |
| 7,353,812 B1 | 4/2008 | Gosdzinski et al. |
| 7,610,140 B2 | 10/2009 | Hirooka |
| 7,628,170 B2 | 12/2009 | Kok-Hiong et al. |
| 7,673,653 B2 | 3/2010 | Mijers et al. |
| 7,722,132 B2 | 5/2010 | Carlsson |
| 7,926,502 B1 | 4/2011 | Lott |
| 8,136,548 B2 | 3/2012 | Trueb |
| 8,147,225 B2 | 4/2012 | Kuny |
| 8,449,763 B2 | 5/2013 | Duyvesteyn |
| 8,517,056 B2 | 8/2013 | Cullin |
| 8,622,715 B1 | 1/2014 | Lott et al. |
| 8,839,607 B2 | 9/2014 | Pursifull et al. |
| 9,074,523 B2 | 7/2015 | Ulrey et al. |
| 9,133,796 B2 | 9/2015 | Plymale et al. |
| 2002/0027041 A1 | 3/2002 | Czabala et al. |
| 2004/0036185 A1 | 2/2004 | Garcia |
| 2004/0094848 A1 | 5/2004 | Lange |
| 2004/0113288 A1 | 6/2004 | Korzeniowski |
| 2005/0045417 A1 | 3/2005 | Ni |
| 2005/0061378 A1 | 3/2005 | Foret |
| 2005/0121084 A1 | 6/2005 | Andersson |
| 2005/0257838 A1 | 11/2005 | Enerson |
| 2006/0016477 A1 | 1/2006 | Zaparackas |
| 2007/0044848 A1 | 3/2007 | Norman |
| 2007/0152355 A1 | 7/2007 | Hartley |
| 2008/0145238 A1 | 6/2008 | Shibayama et al. |
| 2011/0132311 A1 | 6/2011 | Pursifull et al. |
| 2011/0186151 A1 | 8/2011 | Sparazynski |
| 2011/0240753 A1 | 10/2011 | Stevenson et al. |
| 2012/0024249 A1 | 2/2012 | Fuhrmann et al. |
| 2012/0080134 A1 | 4/2012 | Harris et al. |
| 2012/0199104 A1* | 8/2012 | Vogl ............... F01M 13/04 123/572 |
| 2013/0139911 A1 | 6/2013 | Wilson et al. |
| 2013/0160877 A1 | 6/2013 | Walter et al. |
| 2013/0213510 A1 | 8/2013 | Burnham et al. |
| 2013/0233276 A1 | 9/2013 | Pursifull et al. |
| 2013/0233287 A1 | 9/2013 | Leone |
| 2013/0340732 A1 | 12/2013 | Pursifull et al. |
| 2014/0014080 A1 | 1/2014 | Beshay et al. |
| 2014/0123941 A1 | 5/2014 | Ulrey et al. |
| 2014/0165962 A1 | 6/2014 | Pursifull |
| 2014/0196694 A1 | 7/2014 | Euliss et al. |
| 2014/0197345 A1 | 7/2014 | Graichen et al. |
| 2014/0217679 A1 | 8/2014 | Barrall et al. |
| 2014/0360607 A1* | 12/2014 | Fletcher ............ B60T 13/52 137/888 |
| 2014/0366527 A1 | 12/2014 | Fletcher et al. |
| 2015/0114348 A1 | 4/2015 | Pursifull et al. |
| 2015/0114350 A1 | 4/2015 | Pursifull |
| 2015/0147196 A1 | 5/2015 | Chahal et al. |
| 2015/0147523 A1* | 5/2015 | Kumar ............... C09D 1/00 428/141 |
| 2015/0158477 A1 | 6/2015 | Luehrsen |
| 2015/0159677 A1 | 6/2015 | Hampton et al. |
| 2015/0308461 A1 | 10/2015 | Tell |
| 2016/0010661 A1 | 1/2016 | Fletcher et al. |
| 2016/0040688 A1 | 2/2016 | Fletcher et al. |

FOREIGN PATENT DOCUMENTS

| | | |
|---|---|---|
| DE | 4310761 | 10/1994 |
| DE | 202005020261 | 5/2007 |
| DE | 102008043768 | 10/2009 |
| EP | 0545121 | 6/1993 |
| GB | 190603061 | 11/1906 |
| GB | 2129516 | 5/1984 |
| JP | 2004174475 A | 6/2004 |
| JP | 2009168134 | 7/2009 |
| WO | 2014/094890 | 6/2014 |
| WO | 2015/089176 | 6/2015 |

OTHER PUBLICATIONS

Racing Vacuum Pump PE 10000-01; http://www.product-engr.com/vacuum_pump.html (first published at least as early as Feb. 20, 2011).

PCT, International Search Report and Written Opinion, PCT/US2014/041250 (dated Oct. 27, 2014).

PCT, International Search Report and Written Opinion, PCT/US2014/059672 (dated Jan. 9, 2015).

PCT, International Search Report and Written Opinion, PCT/US2015/012018 (dated May 8, 2015).

PCT, International Search Report and Written Opinion, PCT/US2015/024195 (dated Jul. 24, 2015).

(56) References Cited

OTHER PUBLICATIONS

PCT, International Search Report and Written Opinion, PCT/US2015/033079 (dated Aug. 21, 2015).
PCT, International Search Report and Written Opinion, PCT/US2015/039950 (dated Oct. 5, 2015).
PCT, International Search Report and Written Opinion, PCT/US2015/043911 (dated Nov. 6, 2015).
PCT, International Search Report and Written Opinion, PCT/US2016/012260 (dated Mar. 16, 2016).
U.S., Non-Final Office Action, U.S. Appl. No. 14/294,727; (dated Oct. 8, 2015).
U.S., Non-Final Office Action, U.S. Appl. No. 14/565,075; (dated Nov. 16, 2015).
U.S., Non-Final Office Action, U.S. Appl. No. 14/509,612; (dated Dec. 18, 2015).
U.S., Non-Final Office Action, U.S. Appl. No. 14/600,598; (dated Feb. 11, 2016).
U.S., Final Office Action, U.S. Appl. No. 14/565,075; (dated Apr. 1, 2016).
U.S., Final Office Action, U.S. Appl. No. 14/294,727; (dated Apr. 22, 2016).
English translation of JP 07-117010, accessed Nov. 9, 2015, <https://www4.j-platpat.inpit.go.jp/cgi-bin/tran_web_cgi_ejje?u=http://www4.j-platpat.inpit.go.jp/eng/translation/201511100304293322079174692401010 0932AF2D1BD4629B19B03A22964BC2FC8>.
U.S., Final Office Action, U.S. Appl. No. 14/509,612; (dated Jun. 22, 2016).
U.S., Non-Final Office Action; U.S. Appl. No. 14/565,075; (dated Jul. 21, 2016).
PCT, International Search Report and Written Opinion, PCT/US2016/027229 (dated Jul. 15, 2016).
U.S., Advisory Action; U.S. Appl. No. 14/294,727 (dated Aug. 22, 2016).
PCT, International Search Report and Written Opinion; PCT/US2016/021559 (dated May 12, 2016).
U.S., Advisory Action; U.S. Appl. No. 14/509,612; (dated Sep. 1, 2016).
U.S., Notice of Allowance; U.S. Appl. No. 14/509,612; (dated Oct. 17, 2016).
CN, Search Report with English translation; Chinese Patent Application No. 201480001422.9 (dated Jul. 20, 2016).
CN, Office Action with English translation; Chinese Patent Application No. 201480001422.9 (dated Aug. 1, 2016).
U.S., Final Office Action; U.S. Appl. No. 14/600,598; (dated Aug. 19, 2016).
PCT, International Search Report and Written Opinion, PCT/US2016/042228 (dated Oct. 17, 2016).
PCT, International Search Report and Written Opinion, PCT/US2016/059376 (dated Dec. 29, 2016).
CN, Office Action and Search Report with English translation; Chinese Patent Application No. 201410413220.7; 2016) (dated Nov. 14, 2016).
CN, First Office Action; Chinese Application No. 201680040276X (dated Oct. 30, 2018).
CN, First Office Action Search Report; Chinese Application No. 2016800402776X (dated Oct. 30, 2018).

\* cited by examiner

VENTURI DEVICES RESISTANT TO ICE FORMATION FOR PRODUCING VACUUM FROM CRANKCASE GASES

RELATED APPLICATIONS

This application claims the benefit of U.S. Provisional Application No. 62/247,434, filed Oct. 28, 2015, which is incorporated herein by reference.

TECHNICAL FIELD

This application relates to devices for producing vacuum using the Venturi effect, more particularly to such devices having a textured internal surface of at least a suction port that provides a hydrophobic effect with an oleophobic coating applied to the textured internal surface.

BACKGROUND

Engines, for example vehicle engines, are being downsized and boosted, which is reducing the available vacuum from the engine. This vacuum has many potential uses, including use by the vehicle brake booster. One solution is to utilize other fluids in an engine that could generate vacuum, such as crankcase gases, as disclosed in U.S. Publication No. 2013/0340732. One problem with crankcase gases is the likelihood of the presence of water and/or oil, as liquid or gas, in the crankcase gases, and the operating conditions allowing the same to be cooled, thereby condensing and/or freezing the crankcase gases. The freezing of the crankcase gases may build up and either impair or block the flow of fluids through the device, thereby impairing or preventing the generation of vacuum using the crankcase gases.

A need exists for improved designs that are resistant to ice and/or oil build up in the ports of the Venturi device.

SUMMARY

In one aspect, devices for producing vacuum using the Venturi effect are disclosed that overcome the problems discussed in the background and meet the need of an improved design that is resistant to ice and/or oil build up in the ports of the Venturi device. The Venturi device has a housing that defines a Venturi gap, a motive passageway converging toward the Venturi gap and in fluid communication therewith, a discharge passageway diverging away from the Venturi gap and in fluid communication therewith, and a suction passageway in fluid communication with the Venturi gap. The suction passageway has an interior surface with a surface topography that renders the interior surface thereof hydrophobic and has an oleophobic coating applied to the interior surface while maintaining the surface topography. The surface topography may be plasma etched or laser etched into the material defining the suction passageway, a coating or film comprising particles of material of selected size and shape to render the interior surface hydrophobic, or mechanically etched into the material defining the suction passageway. The oleophobic coating is a composition having a fluoropolymer, a silicone, or combinations thereof. In one embodiment, the oleophobic coating comprises polytetrafluoroethylene.

In all aspects, the Venturi device may have a cross-sectional area of the motive exit that is smaller than a cross-sectional area of the discharge entrance, and a suction chamber housing the Venturi gap into which the discharge entrance protrudes a distance, thereby providing suction flow around the entirety of an exterior surface of the discharge entrance. This suction chamber typically has a generally rounded interior bottom below the discharge entrance, and an internal width of about 10 mm to about 25 mm.

In all aspects, the Venturi device may have the motive passageway and the discharge passageway both diverging in a cross-sectional area away from the Venturi gap as a hyperbolic or parabolic function.

In another aspect, systems are disclosed that include one or more of the Venturi devices described herein. In one embodiment, the system has a source of higher pressure fluidly connected to the motive passageway of the Venturi device, a source of lower pressure, relative to the source of higher pressure, fluidly connected to the discharge passageway of the Venturi device, and blowby gases from a crankcase fluidly connected to the suction passageway. The source of higher pressure is atmospheric pressure or it is boost pressure from a compressor of a turbocharger or supercharger.

In another aspect, methods of making a Venturi device having a suction passageway with an interior surface with a surface topography that renders the interior surface thereof hydrophobic and an oleophobic coating applied to the interior surface while maintaining the surface topography are disclosed herein. The methods include: providing a housing defining a suction chamber, a motive passageway converging toward the suction chamber and in fluid communication therewith, a discharge passageway diverging away from the suction chamber and in fluid communication therewith, and a suction passageway in fluid communication with the suction chamber, texturing the interior surface of the suction passageway to have a surface topography that renders the interior surface hydrophobic, and subsequent to texturing the interior surface, coating the interior surface with an oleophobic coating while maintaining the surface topography. The methods may also include texturing the interior surface of the suction chamber to have a surface topography that renders the interior surface hydrophobic, and subsequently coating the interior surface of the suction chamber with an oleophobic coating while maintaining the surface topography, and/or texturing the interior surface of the discharge chamber to have a surface topography that renders the interior surface hydrophobic, and subsequently coating the interior surface of the discharge chamber with an oleophobic coating while maintaining the surface topography. In all aspects of the methods, texturing any one of these interior surfaces may involve plasma etching or laser etching a surface topography, applying a coating or a film that has particles of material of selected size and shape therein to provide the surface topography, or mechanically etching the surface topography into the material defining any of these interior surfaces.

DETAILED DESCRIPTION

Figure 1:
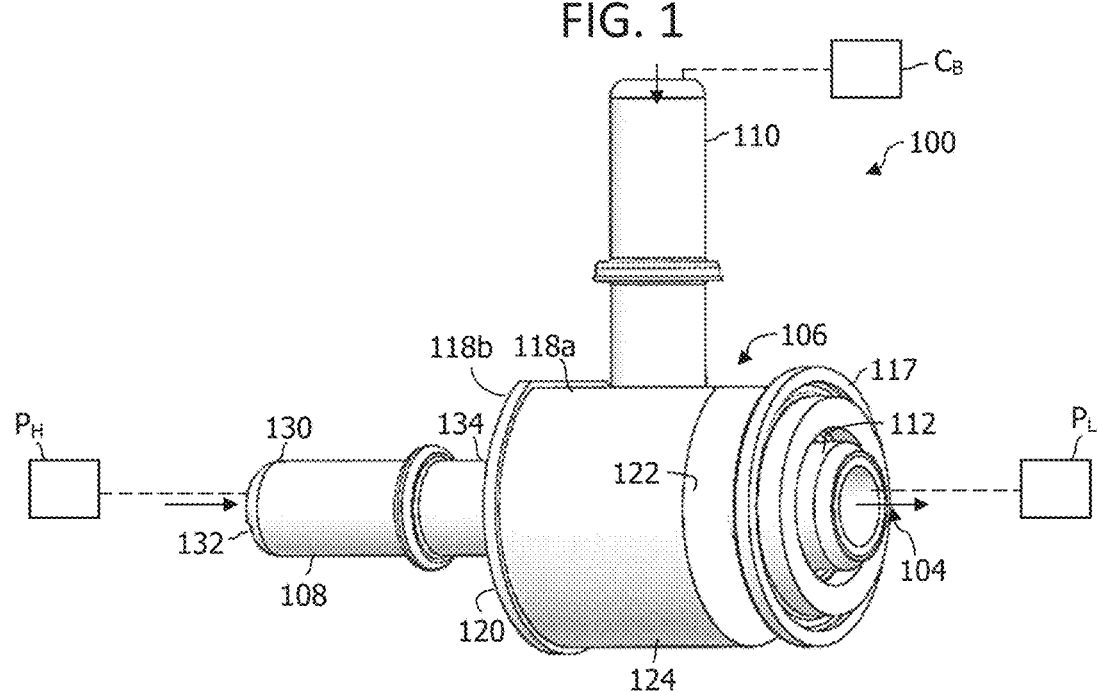
FIG. 1 is a side, perspective view of a device that generates vacuum using the Venturi effect.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

Figure 2:
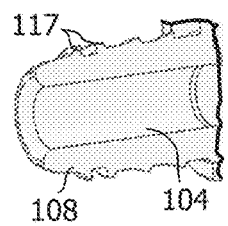
FIG. 2 is a side, longitudinal, cross-sectional view of just the inlet end of the motive port of an alternate embodiment of the device of FIG. 1.
Figure 3:
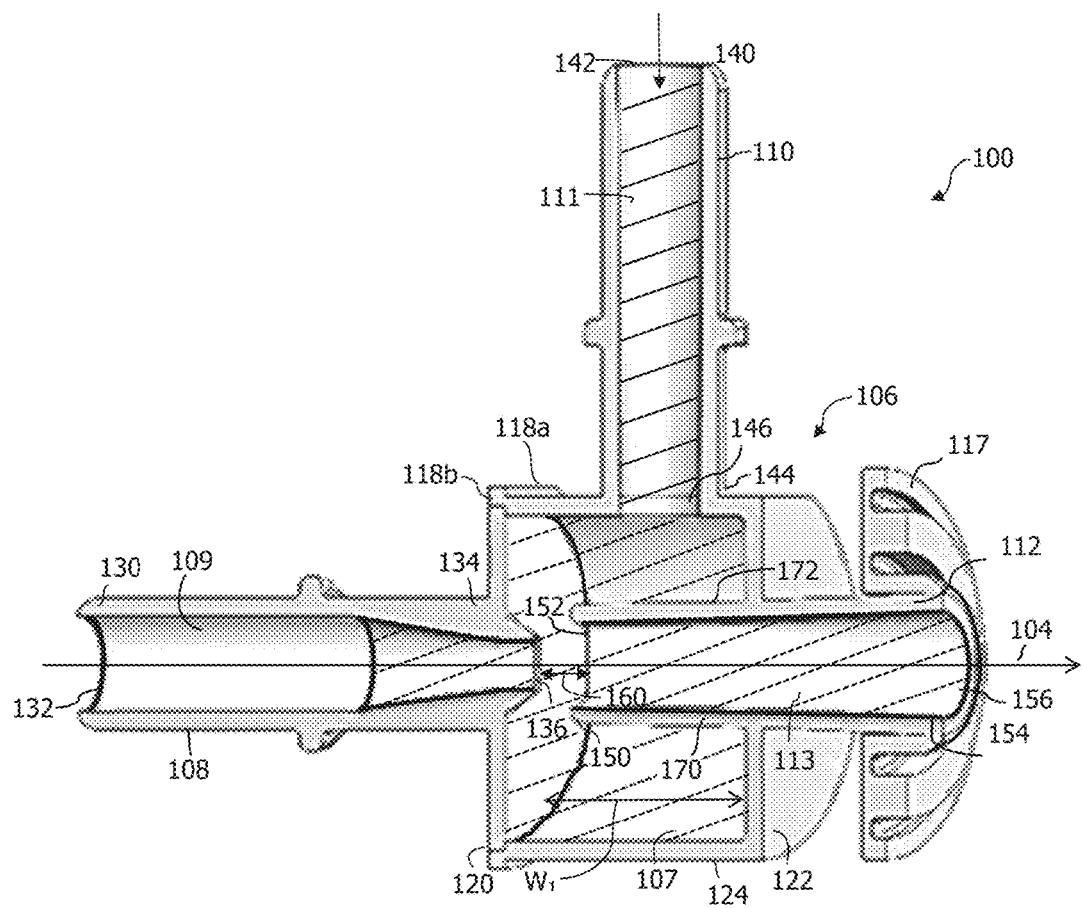
FIG. 3 is a side, longitudinal, cross-sectional view of the device of FIG. 1.

FIGS. 1-3 illustrate different views of a device 100 for producing vacuum using a Venturi effect. The device 100 may be used in an engine, for example, in a vehicle's engine to provide vacuum to a device such as a vehicle brake boost device, positive crankcase ventilation system, a fuel purge device, a hydraulic and/or pneumatic valve, etc. Device 100 includes a housing 106 defining a suction chamber 107 in fluid communication with passageway 104 (FIG. 3) and having at least three ports that are connectable to an engine or components connected thereto. The ports include: (1) a motive port 108; (2) a suction port 110, which can connect via an optional check valve (not shown) to a device requiring vacuum (not shown); and (3) a discharge port 112. Each of these ports 108, 110, and 112 may include a connector feature 117 on an outer surface thereof for connecting the respective port to a hose or other component in the engine, as shown in FIG. 2 for the motive port 108 or in FIG. 3 for the discharge port 112.

Referring now to FIGS. 1 and 3, the housing 106 defining the suction chamber 107 includes a first end wall 120 proximate the motive port 108, a second end wall 122 proximate the discharge port 112, and at least one side wall 124 extending between the first and second end walls 120, 122. The suction chamber 107, when viewed in a transverse cross-section, may have a generally rounded bottom below the entrance 152 to the discharge port 112. As shown in FIG. 3, the suction chamber 107 may be a two-part construction having a container 118a and a lid 118b, where the lid 118b seats within or against a rim 119 of the container 118a with a fluid-tight seal. Here, the container 118a includes the suction port 110 and the discharge port 112, and the lid 118b includes the motive port 108, but is not limited thereto. In another embodiment, the container could include the motive port and the lid could include the suction port and the discharge port, or just the discharge port.

The motive port 108 defines a motive passageway 109, shown in FIG. 3, for the flow of fluid toward the suction chamber 107 and in fluid communication therewith. The motive port 108 includes an inlet end 130 having a motive entrance 132 and an outlet end 134 having a motive exit 136. The motive passageway 109 may have a circularly-shaped motive entrance and the passageway may be straight and/or it may gradually, continuously taper toward a motive exit 136, which may be generally circular, elliptical, or any other polygonally-shaped opening.

Still referring to FIG. 3, the suction port 110 defines a suction passageway 111 in fluid communication with the suction chamber 107. The suction port 110 includes an inlet end 140 having a suction entrance 142 and an outlet end 144 having a suction exit 146, wherein both the motive exit 136 and the suction exit 146 exit into the suction chamber 107. As illustrated in FIG. 3, the suction passageway 111 enters the suction chamber 107 at a position that generates about a ninety degree change in the direction of the suction flow from the suction passageway 111 to the discharge passageway 113. Accordingly, the suction port 110 is generally oriented perpendicular to the discharge port 112, and may be a generally cylindrical passageway of constant dimension(s) or it may gradually, continuously taper as a cone or according to a hyperbolic or parabolic function along its length converging toward the suction chamber 107. In other embodiments, the suction port 110 could enter the suction chamber 107 at a position that generates about a 180 degree change in the direction of the suction flow from the suction passageway 111 to the discharge passageway 113. Such suction port would be generally parallel to the discharge port 112.

Device 100 has the outlet end 134 of the motive passageway 109, more specifically, the motive exit 136, generally aligned with and spaced apart from the discharge entrance 152 at the inlet end 150 of the discharge passageway 113 to define a Venturi gap 160. The Venturi gap 160, as used herein, means the lineal distance between the motive exit 136 and the discharge entrance 152.

Referring to FIG. 3, the discharge port 112 defines a discharge passageway 113 in fluid communication with the suction chamber 107, which diverges away from the suction chamber 107. The discharge port 112 includes an inlet end 150 within the suction chamber 107, having a discharge entrance 152, and an outlet end 154, distal from the suction chamber 107, having a discharge exit 156. The discharge passageway 113 terminates in a spout 170 protruding into the suction chamber 107, which has an internal width $W_1$ of about 10 mm to about 25 mm, or more preferably about 15 mm to about 20 mm. The spout 170 is disposed spaced apart from one or more sidewalls 124 of the suction chamber 107, thereby providing suction flow around the entirety of an exterior surface 172 of the spout 170. The exterior surface 172 is generally frustoconical and converges toward the inlet end 150 of the discharge passageway 113. The exterior surface 172 may transition into a chamfer (not shown) more proximate the inlet end 150 than the second end wall 122. The shape of the exterior surface 172, and/or the chamfer, and the generally rounded interior bottom of the suction chamber 107 are advantageous to direct suction flow toward the discharge entrance 152, and do so with minimal disturbance/interference in the flow.

The spout 170 has a wall thickness that may be about 0.5 mm to about 5 mm, or about 0.5 to about 3 mm, or about 1.0 mm to about 2.0 mm depending upon the material selected for the construction of the device 100. The cross-sectional area of the motive exit 136 is typically smaller than the cross-sectional area of the discharge entrance 152; this difference is referred to as the offset. The offset of the cross-sectional areas may vary depending upon the parameters of the system into which the device 100 is to be incorporated. In one embodiment, the offset may be in the range of about 0.1 mm to about 2.0 mm, or more preferably in a range of about 0.3 mm to about 1.5 mm. In another embodiment, the offset may be in the range of about 0.5 mm to about 1.2 mm, or more preferably in a range of about 0.7 mm to about 1.0 mm.

The device 100 may include a fletch (not shown) positioned with the motive passageway 109 and/or a tail (not shown), a plurality of motive exits, or a subdivided motive passageway as disclosed in co-pending U.S. application Ser. No. 15/210,190, filed Jul. 14, 2016.

When device 100 is for use in a vehicle engine, the vehicle manufacturer typically selects the size of both the motive port 108 and discharge port 112 based on the tubing/hose size available for connection of the evacuator Venturi device to the engine or components thereof. Additionally, the vehicle manufacturer typically selects the maximum motive flow rate available for use in the system, which in turn will dictate the area of the interior opening defined at the motive outlet end 134, i.e., the motive exits 136. Working within these constraints, the disclosed device 100 significantly reduces the compromise between the desire to produce high suction flow rates at moderate motive flow rates provided under selected engine conditions.

In operation, the device 100, as labeled in FIG. 1, has the suction port 110 connected to the crankcase, in particular to a source of blowby gases ($C_B$) therein, and has the motive port 108 connected, for fluid communication of its motive passageway 109, to a source of high pressure ($P_H$) and the discharge port 112 connected, for fluid communication of its discharge passageway 113, to lower pressure ($P_L$). In one embodiment, the source of high pressure ($P_H$) may be boosted pressure from the compressor of the turbocharger or supercharger, and device 100 may be referred to as an ejector. In another embodiment, the source of high pressure ($P_H$) may be atmospheric pressure, such as the air entering through the air intake filter, and the source of lower pressure ($P_L$) may be the intake manifold under certain engine conditions. In this embodiment, the device 100 may be referred to as an aspirator. The flow of fluid (e.g., air) from the motive port to the discharge port draws the fluid down the motive passageway, which can be a straight cone or a hyperbolic profile as described herein. The reduction in area causes the velocity of the air to increase. Because this is an enclosed space, the laws of fluid mechanics state that the static pressure must decrease when the fluid velocity increases. The minimum cross-sectional area of the converging motive passageway abuts the Venturi gap. As air continues to travel to the discharge port, it travels through the discharge entrance and converging discharge passageway, which is either a straight cone or a hyperbolic profile. Optionally, the discharge passageway can continue as a straight or hyperbolic profile cone until it joins the discharge exit, or it can transition to a simple cylindrical or tapered passageway before reaching the discharge exit.

Figure 4:
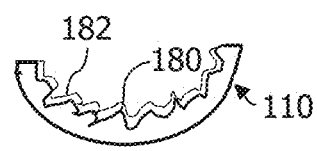
FIG. 4 is a transverse, cross-sectional view of the suction port from the side, longitudinal, cross-sectional view of FIG. 3.

To solve the problem of impairment or blockage of the suction port 110 from the freezing of the blowby gases in the device 100, in particular in the suction passageway 111, and optionally in the suction chamber 107 and the discharge passageway 113, the interior surface of any of these has a surface topography 180 that renders the interior surface hydrophobic and has an oleophobic coating 182 applied to the interior surface, while maintaining the surface topography as generally illustrated in FIG. 4 for the suction port 110. The combined effect is a surface resistant to ice formation, referred to as an anti-icing surface. The surface topography 180 may be mechanically etched such as by sand blasting, sanding, grinding, or the like, or by plasma etching or laser etching the material defining the interior surface of the suction passageway 111. In another embodiment, the surface topography 180 may be achieved by applying a coating or a film that contains small grains or an inert material, with shapes and sizes to produce a hydrophobic effect. Suitable materials for the small grains or inert material include, but are not limited to, titanium oxide, aluminum oxide, silicon carbide, and combinations thereof.

The oleophobic coating 182 comprises fluoropolymer, silicone, and combinations thereof. In one embodiment, the oleophobic coating comprises fluorinated or perfluorinated alkyl groups (e.g., where the terminal functionality, that is the R group(s) of a silane of the formula $R_4-nSi-Xn$, are fluorinated alkyl or perfluoroalkyl). In one embodiment, the oleophobic coating comprises polytetrafluoroethylene.

The devices disclosed herein may be made of a plastic material or other suitable material(s) for use in a vehicle engine, one that can withstand engine and road conditions, including temperature, moisture, pressures, vibration, and dirt and debris, and may be made by injection molding or other casting or molding processes.

The device 100 may be made by molding the housing from a plastic material, texturing the interior surface of the suction passageway 111, the suction chamber 107, and/or the discharge passageway 113, and, subsequent to texturing, coating any or all of these interior surfaces with an oleophobic coating 182 while maintaining the surface topography 180 formed by texturing the interior surface. Methods for coating the interior surface may include painting or spraying on the coating material or coating composition, and/or dipping the part into a bath of the coating material or coating composition.

A hydrophobic surface, as used herein, means a surface that has water droplet formation thereon at a surface contact angle exceeding about 90° and less than about 150° at temperatures from −40 to +20° C. A superhydrophobic surface, as used herein, means a surface that has water droplet formation thereon at a surface contact angle exceeding about 150°, but less than the theoretical maximum contact angle of about 180° at temperatures from −40 to +20° C. An oleophobic material or surface, as used herein, means a material or surface that has droplet formation thereon of light mineral oil at a surface contact angle exceeding about 25° and less than the theoretical maximum contact angle of about 180° at room temperature.

Although the invention is shown and described with respect to certain embodiments, it is obvious that modifications will occur to those skilled in the art upon reading and understanding the specification, and the present invention includes all such modifications.

What is claimed is:

1. A device for producing vacuum using the Venturi effect comprising:
 a housing defining a Venturi gap, a motive passageway converging toward the Venturi gap and in fluid communication therewith, a discharge passageway diverging away from the Venturi gap and in fluid communication therewith, a suction passageway in fluid communication with the Venturi gap, and a suction chamber housing the Venturi gap and into which a spout defining a discharge entrance or defining a motive exit protrudes a distance;
 wherein the spout is disposed spaced apart from all sidewalls of the suction chamber for suction flow around the entirety of an exterior surface of the spout, wherein the exterior surface of the spout is generally frustoconical and converges inward within the suction chamber;
 wherein the suction passageway has an interior surface with a surface topography that renders the interior surface hydrophobic and has an oleophobic coating applied to the interior surface while maintaining the surface topography.

2. The device of claim 1, wherein a cross-sectional area of the motive exit is smaller than a cross-sectional area of the discharge entrance.

3. The device of claim 1, wherein the suction chamber has a generally rounded interior bottom below the discharge entrance.

4. The device of claim 1, wherein the suction chamber has an internal width of about 10 mm to about 25 mm.

5. The device of claim 1, wherein the motive passageway and the discharge passageway both diverge in a cross-sectional area away from the Venturi gap as a hyperbolic or parabolic function.

6. The device of claim 1, wherein the surface topography is plasma etched or laser etched into the material defining the suction passageway.

7. The device of claim 1, wherein the surface topography is a coating or film comprising particles of material of selected size and shape to render the interior surface hydrophobic.

8. The device of claim 1, wherein the surface topography is mechanically etched into the material defining the suction passageway.

9. The device of claim 1, wherein the oleophobic coating comprises a fluoropolymer, a silicone, or combinations thereof.

10. The device of claim 9, wherein the oleophobic coating comprises polytetrafluoroethylene.

11. A system comprising:
the Venturi device of claim 1;
a source of higher pressure fluidly connected to the motive passageway;
a source of lower pressure, relative to the source of higher pressure, fluidly connected to the discharge passageway; and
blowby gases from a crankcase fluidly connected to the suction passageway.

12. The system of claim 11, wherein the source of higher pressure is atmospheric pressure or is boost pressure from a compressor of a turbocharger or supercharger.

13. A method of making a Venturi device comprising:
providing a housing defining a suction chamber, a motive passageway converging toward the suction chamber and in fluid communication therewith, a discharge passageway diverging away from the suction chamber and in fluid communication therewith, a suction passageway in fluid communication with the suction chamber, and a suction chamber housing the Venturi gap and into which a spout defining a discharge entrance or defining a motive exit protrudes a distance;
wherein the spout is disposed spaced apart from all sidewalls of the suction chamber for suction flow around the entirety of an exterior surface of the spout, wherein the exterior surface of the spout is generally frustoconical and converges inward within the suction chamber;
texturing the interior surface of the suction passageway to have a surface topography that renders the interior surface hydrophobic; and
subsequent to texturing the interior surface, coating the interior surface with an oleophobic coating while maintaining the surface topography.

14. The method of claim 13, further comprising texturing the interior surface of the suction chamber to have a surface topography that renders the interior surface hydrophobic, and subsequently coating the interior surface of the suction chamber with an oleophobic coating while maintaining the surface topography.

15. The method of claim 14, further comprising texturing the interior surface of the discharge chamber to have a surface topography that renders the interior surface hydrophobic, and subsequently coating the interior surface of the discharge chamber with an oleophobic coating while maintaining the surface topography.

16. The method of claim 13, wherein texturing the interior surface comprises plasma etching or laser etching a surface topography into the material defining the suction passageway.

17. The method of claim 13, wherein texturing the interior surface comprises applying a coating or a film that has particles of material of selected size and shape therein to render the interior surface hydrophobic.

18. The method of claim 13, wherein texturing the interior surface comprises mechanically etching the surface topography into the material defining the suction passageway.

19. The device of claim 1, wherein the oleophobic coating consists of a fluoropolymer, a silicone, or combinations thereof.

* * * * *